United States Patent
Evans

(10) Patent No.: US 8,636,474 B2
(45) Date of Patent: Jan. 28, 2014

(54) ROTOR ASSEMBLY FOR A GAS TURBINE

(75) Inventor: Dale Edward Evans, Derby (GB)

(73) Assignee: Rolls-Royce PLC (GB)

( * ) Notice: Subject to any disclaimer, the term of this patent is extended or adjusted under 35 U.S.C. 154(b) by 597 days.

(21) Appl. No.: 12/839,578

(22) Filed: Jul. 20, 2010

(65) Prior Publication Data

US 2011/0038731 A1   Feb. 17, 2011

(30) Foreign Application Priority Data

Aug. 12, 2009 (GB) .................................. 0914060.9

(51) Int. Cl.
*F01D 5/30* (2006.01)

(52) U.S. Cl.
USPC .................................. 416/193 R; 416/220 R

(58) Field of Classification Search
USPC .......... 416/193 A, 193 R, 194, 196 R, 204 A, 416/219 R, 220 R, 248
See application file for complete search history.

(56) References Cited

U.S. PATENT DOCUMENTS

| | | | | |
|---|---|---|---|---|
| 2,935,296 | A * | 5/1960 | Hockert et al. | 416/220 R |
| 3,245,657 | A * | 4/1966 | Cooper, Jr. et al. | 415/174.2 |
| 3,712,757 | A * | 1/1973 | Goodwin | 416/245 R |
| 3,734,646 | A * | 5/1973 | Perkins | 416/220 R |
| 4,875,830 | A | 10/1989 | Trousdell et al. | |
| 5,131,814 | A | 7/1992 | Przytulski et al. | |
| 5,259,728 | A * | 11/1993 | Szpunar et al. | 416/2 |
| 5,624,233 | A * | 4/1997 | King et al. | 416/219 R |
| 6,253,632 | B1 | 7/2001 | Poulek | |
| 6,634,863 | B1 | 10/2003 | Forrester et al. | |
| 6,726,452 | B2 | 4/2004 | Strassberger et al. | |
| 6,929,453 | B2 | 8/2005 | Kite et al. | |
| 2005/0129522 | A1 | 6/2005 | Kite et al. | |
| 2007/0059163 | A1 | 3/2007 | Tiemann | |
| 2008/0018056 | A1* | 1/2008 | Evans | 277/590 |

FOREIGN PATENT DOCUMENTS

| | | |
|---|---|---|
| DE | 3151136 A1 | 12/1982 |
| DE | 19548593 A1 | 7/1997 |
| DE | 19931765 A1 | 1/2001 |
| EP | 1881160 A2 | 1/2008 |
| EP | 2090749 A2 | 8/2009 |
| EP | 2108786 A2 | 10/2009 |
| FR | 1341910 A | 11/1963 |
| GB | 1331209 A | 9/1973 |
| GB | 2171151 A | 8/1986 |
| SU | 480882 A1 | 8/1975 |
| WO | 02076665 A1 | 10/2002 |
| WO | 2005049420 A1 | 6/2005 |

* cited by examiner

*Primary Examiner* — Nathaniel Wiehe
*Assistant Examiner* — Woody A Lee, Jr.
(74) *Attorney, Agent, or Firm* — McCormick, Paulding & Huber LLP

(57) ABSTRACT

A rotor assembly, for a gas turbine, has a plurality of rotor discs interconnected by an axially extending rim. The outside of the rim has a circumferential array of dovetail slots and the underside of the rim has a circumferential channel which extends radially part way into the slots, the respective discs thus being interconnected axially across the channel by an array of circumferentially spaced connecting portions. There is an array of blades, each blade having a blade root secured in a respective one of the dovetail slots.

12 Claims, 9 Drawing Sheets

ROTOR ASSEMBLY FOR A GAS TURBINE

CROSS REFERENCE TO RELATED APPLICATION

This application is entitled to the benefit of British Patent Application No. GB 0914060.9, filed on Aug. 12, 2009.

FIELD OF THE INVENTION

The present invention relates to a rotor assembly for a gas turbine engine, in particular the bypass fan assembly of a turbo fan engine.

BACKGROUND OF THE INVENTION

A conventional turbo fan engine uses the core engine to drive a bypass fan mounted near the engine intake. Fan blades on the bypass fan drive a bypass flow around the core engine which combines downstream with the core exhaust flow to provide propulsive thrust.

A casing assembly extends around the outside of the fan to provide an outer wall of a flow annulus through the fan. The fan blades themselves are not normally provided with blade platforms, and so a number of separate circumferential wall inserts or "annulus fillers" are mounted on the outside of the fan rotor disc, in-between the fan blades, to form the inner wall of the flow annulus through the fan.

The annulus fillers are typically mounted on the fan rotor disc using a hook arrangement, such as the one described in International Application PCT/GB93/00372 (published as WO93/21425). Here, each annulus filler is provided with a pair of hooks, which extend radially inwardly from the filler to engage correspondingly shaped hooks provided on the outer face of the fan rotor disc. The hooks on the filler must be maintained in axial engagement with the hooks on the fan rotor disc, and one or more separate thrust rings is typically provided for this purpose.

A hook-type mounting arrangement such as the one described in International Application PCT/GB93/00372 has several disadvantages:

Firstly, the need to form dedicated, load-bearing attachment features such as hooks on the outside of a forged fan rotor disc adds to the cost and complexity of manufacturing the fan rotor disc.

In addition, safely engaging the hooks with one another is difficult and potentially time-consuming because, in practice, the hooks tend to be obscured from view by the adjacent blades and by the annulus filler itself during assembly. Failure safely to engage the hooks increases the risk of annulus filler detachment under a centrifugal load during rotation of the fan.

During a bird strike or fan blade off (FBO) event, a fan blade may be deflected and apply a circumferential load to an adjacent annulus filler. Tests have shown that annulus filler inserts secured using hook style arrangements such as the one described in International Application PCT/GB93/00372 are also vulnerable to detachment under these circumferential loads.

SUMMARY OF THE INVENTION

It is an object of the present invention to seek to provide an improved rotor assembly, and in particular to seek to provide a rotor which addresses one or more of the specific problems referred to above.

According to the present invention there is provided a rotor assembly for a gas turbine, having a plurality of rotor discs interconnected by an axially extending rim, the outside of the rim having a circumferential array of dovetail slots and the underside of the rim having a circumferential channel which extends radially part way into the slots, the respective discs thus being interconnected axially across the channel by an array of circumferentially spaced connecting portions; an array of blades, each blade having a blade root secured in a respective one of the dovetail slots; and an annulus filler assembly, comprising an annulus filler supported on the outside of the rim, in between adjacent blades, so as to form part of the inner wall of a respective flow annulus, the annulus filler additionally being anchored on the underside of the rim by an anchor element which is connected to the annulus filler through a clearance hole in a respective one of the connecting portions.

According to another aspect of the present invention, there is provided a rotor for a gas turbine, having a plurality of rotor discs interconnected by an axially extending rim, the outside of the rim having a circumferential array of dovetail slots and the underside of the rim having a circumferential channel which extends radially part way into the slots, the respective discs thus being interconnected axially across the channel by an array of circumferentially spaced connecting portions; an array of blades, each blade having a blade root secured in a respective one of the dovetail slots; and a blade chocking assembly, comprising a blade chocking member extending circumferentially into one of the slots underneath the corresponding blade root and engaging the underside of the blade root thereby to chock the blade radially outwardly against the flanks of the respective dovetail slot, the chocking member being held in said chocking engagement with the underside of the blade root by a support element seated on the outside of the rim and connected to the chocking member through a clearance hole in a respective one of the connecting portions of the rim.

By anchoring the annulus filler (or supporting the blade chocking member) through clearance holes in the rim of the rotor disc assembly, the requirement to provide dedicated, load-bearing attachment features on the rotor disc assembly itself can be avoided.

Ordinarily, holes in the rim of a rotor disc act as stress raisers, which can lead to the formation of stress cracks in the rim. Substantially free propagation of these stress cracks may result in a critical failure of the fan rotor disc. In the present invention however, the connecting portions are circumferentially isolated from one another, eliminating hoop stresses and circumferential crack propagation between the connecting portions. The connecting portions will thus carry little load in normal running, with radial loads tending to be off-loaded locally and axial loads being limited by passive axial movement of the rotor discs. By providing the clearance holes specifically through these connecting portions, the effects of the clearance holes as stress raisers is therefore significantly reduced.

In one embodiment, the annulus filler is supported on the outside of the ring by a radially extending spacer element forming part of the annulus filler assembly, the relative circumferential width of the spacer element and the annulus filler being such that the spacer element allows for rolling movement of the annulus filler under a circumferential load. It is believed that by allowing rolling movement of the annulus filler, the risk of detachment of the annulus filler under a circumferential load will be reduced, at the same time, it is envisaged that rolling movement of the annulus filler will reduce reaction forces on the blade, thus reducing the potential impact of the annulus filler on blade integrity.

The annulus filler may be fastened directly or indirectly to the anchor element through bores extending through the annulus filler itself. The annulus filler may thus be fastened to the anchor element from the (visible) outside of the annulus filler, facilitating reliable assembly.

The spacer element may be a separate component from the annulus filler, with the spacer element being fixed to the anchor element through the clearance hole in the connecting portion and the annulus filler being fastened to the spacer element through bores in the annulus.

The annulus filler may be fastened by a threaded bolt, which extends through said hole in the annulus filler. In particular, the threaded bolt may extend through said hole from the outside of the annulus filler and engage a threaded hole in the spacer element. Alternatively, the bolt may extend from the underside of the annulus filler (the bolt may form part of the spacer element) and engage with a corresponding threaded nut on the outside of the annulus filler.

The spacer element may be a pillar seated end-on over the clearance hole in the connecting portion, the base of the pillar being screwed to the anchor element through the clearance hole thereby to clamp the pillar on to the outside of the connecting portion, and the opposite end of the pillar being provided with either a threaded hole or bolt which engages respectively with a corresponding bolt or nut through a bore in the annulus filler thereby to secure the annulus filler to the pillar. Again, the relatively narrow circumferential width of the pillar will allow rolling movement of the annulus filler under a circumferential load; at the same time, provided the pillar has sufficient stiffness, the pillar will nevertheless axially retain the annulus filler on the rim.

A plurality of spacer elements, such as pillars may be provided to support the annulus filler.

The chocking member may project radially into a circumferentially extending groove on the underside of the blade root thereby axially to retain the blade root in the slot. Provision of such a "dual purpose" chocking member may negate the need for additional axial retention means for the blades.

According to another aspect of the present invention there is provided a rotor assembly comprising both the aforementioned annulus filler assembly and the blade chocking assembly, wherein a part of the annulus filler assembly on the outside of the rim acts as the support element for the blade chocking assembly, and a part of the blade chocking assembly on the underside of the rim acts as said anchor element for the annulus filler assembly. In this manner, the blade chocking assembly and annulus filler assembly co-operate to hold each other in place, both during assembly and operation of the fan.

The parts may be clamped respectively against the outside and underside of the rim by a tension bearing connector element secured between the parts through the clearance hole in the connecting portion. The tension bearing connector element may be a stud, which may be formed integrally with one of the parts whilst being configured for secure engagement with the other part, for example by means of a suitable screw thread. Alternatively, the stud may be formed separately from both parts and configured for secure attachment to each part.

In a preferred embodiment, the annulus filler or spacer element acts as the support element in the blade chocking assembly, and the chocking member acts as the anchor element in the annulus filler assembly, though other parts may act as the support element and anchor element as appropriate.

The chocking member may be in the form of a segmented ring extending around the circumferential channel, the chocking member being connected to a respective annulus filler or spacer element in each of a plurality of said annulus filler assemblies through a corresponding plurality of said clearance holes in the connecting portions.

In particular, the chocking member is connected to each annulus filler or spacer element by tension-bearing connector elements in the form of studs.

The chocking member may comprise a plurality of holes for alignment with the clearance holes in the connecting portions, the studs being formed separately from the chocking member for insertion through the aligned holes.

DETAILED DESCRIPTION OF THE PREFERRED EMBODIMENTS

Figure 1:
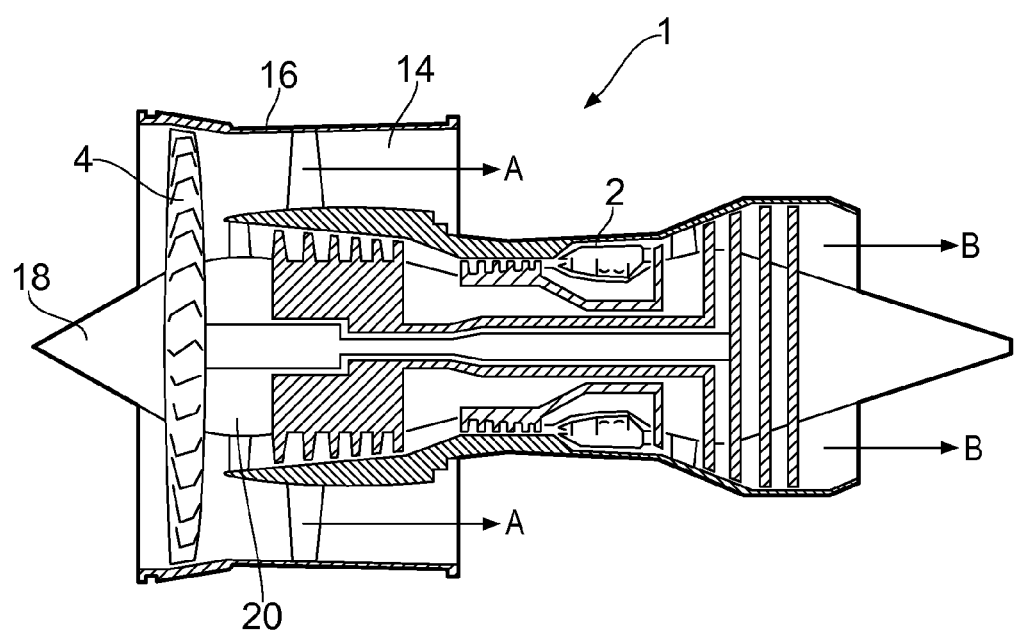
FIG. 1 shows a simplified cross-section through a turbo fan engine incorporating a fan rotor assembly according to the present invention.
Figure 2:
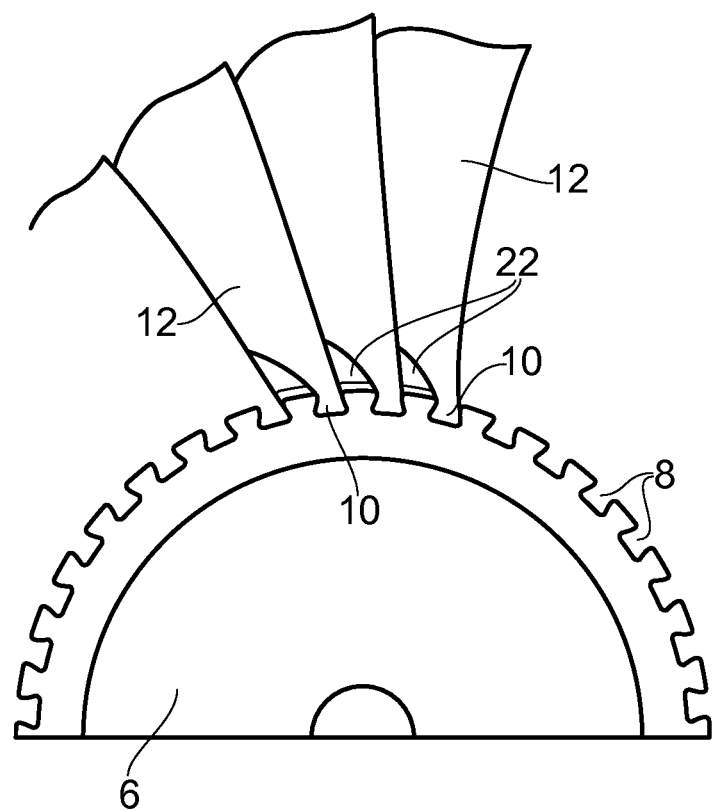
FIG. 2 is a view from the front of the fan rotor assembly in FIG. 1 showing an upper part of the fan rotor assembly.

FIG. 1 shows a turbo fan engine 1 of generally conventional configuration comprising a core engine 2 which drives a fan 4 at the front of the engine 1. The fan 4 comprises a fan rotor disc assembly 6 (FIG. 2) having a circumferential array of axial dovetail slots 8, each of which receives the root 10 of a respective blade 12, there thus being provided a circumferential array of blades 12 around the fan 4.

As the fan 4 rotates, the blades 12 divert a portion of the intake flow into an annular bypass duct 14; this bypass flow A combines with the core exhaust flow B from the core engine 2 to provide propulsive thrust.

The bypass duct 14 is defined by a casing assembly 16, the front portion of which forms the outer wall of a flow annulus through the fan 4. The corresponding inner wall of the flow annulus through the fan 4 is provided immediately upstream of the fan 4 by a nose cone 18, immediately downstream of the fan 4 by a hub section 20 and, in between the blades 12 themselves, by a corresponding plurality of annulus filler inserts mounted on the rotor disc 6 in between the blades 12.

Figure 3:
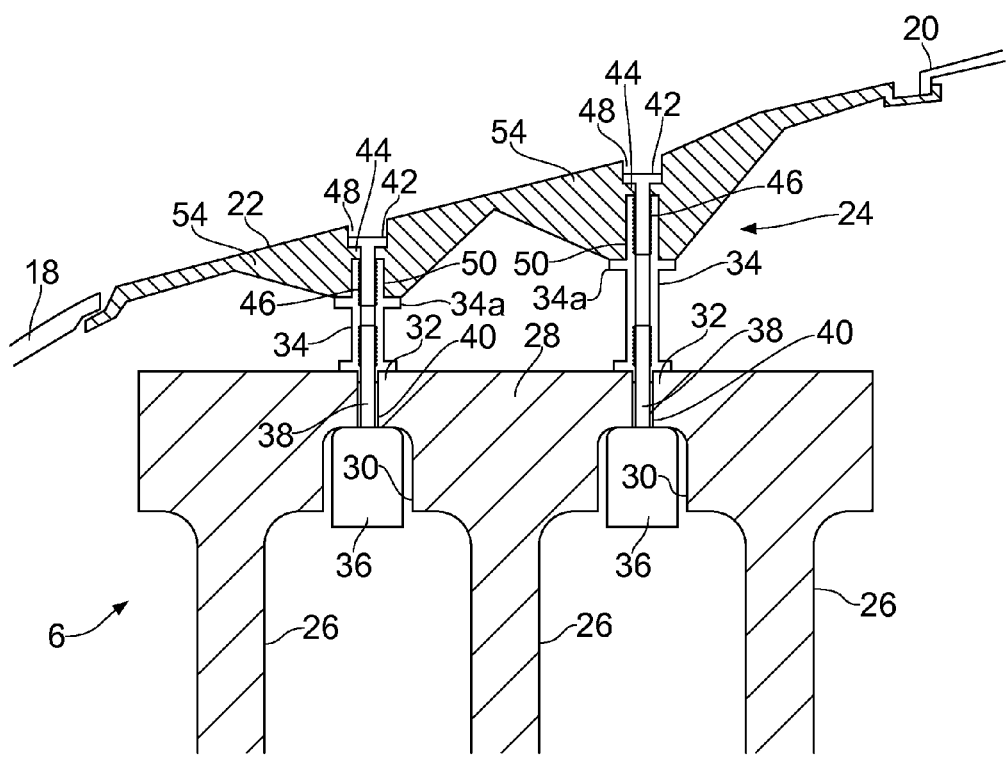
FIG. 3 is a simplified cross-sectional view of an outer part of a fan rotor disc forming part of the fan rotor assembly in FIG. 1, taken along a radius of the fan rotor disc in between adjacent blades.

Each annulus filler insert 22 forms part of a respective annulus filler assembly 24 which secures the filler insert 22 to the outside of the fan rotor disc assembly, as shown in FIG. 3.

Figure 4:
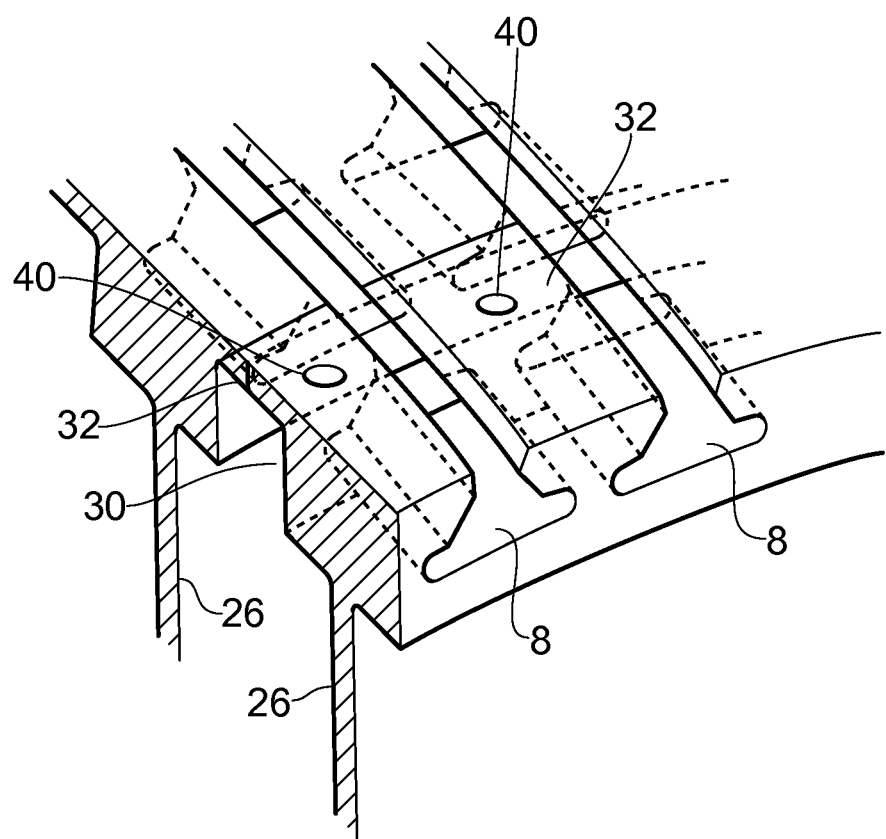
FIG. 4 is a perspective view of the fan rotor disc in FIG. 3.

The fan rotor disc assembly itself is a multi-disc assembly comprising a plurality of rotor discs 26 interconnected by an axially extending rim 28. A circumferential channel 30 is formed on the underside of the rim 28 in between each pair of rotor discs 26. Each circumferential channel 30 extends radially part way into the slots 8, with the respective discs 26 thus being interconnected axially across the channel 30 by a corresponding array of circumferentially spaced connecting portions 32. The connecting portions 32 are best seen in FIG. 4 (which illustrates only one of the channels 30).

Referring back to FIG. 3, the filler insert 22 is supported on the outside of the rim 28 by a pair of radially extending spacer elements in the form of pillars 34. Each of the pillars 34 is anchored on the underside of the rim 28 by a respective anchor element 36 located in the channel 30. Each anchor element 36 is connected to the respective pillar 34 by a stud 38 secured to the anchor element 36 and screwed up into the base of the respective pillar 34 through a clearance hole 40 in the corresponding connecting portion 32. The studs 38 thus act as tension bearing connector elements which act firmly to clamp the pillar 34 and respective anchor element 36 on the outside and underside of the rim 28 respectively.

The annulus filler insert 22 is formed as a separate component from the pillars 34 and is fastened to the pillars 34 by bolts 42 which extend inwardly through bores 44 in the filler insert 22 and screw into corresponding threaded bores 46 formed at the upper end of each of the posts 34.

The bolts 42 are recessed below the outer surface of the filler insert 22 by a counter-bore 48. A respective counter-bore 50 is formed in a boss portion 52 on the underside of the filler insert 22 (the bore 44 in each case forming a relatively narrow neck between the counter-bores 48 and 52). The counter-bores 52 receive the upper ends of the post 34 to assist with initial location and alignment of the filler insert 22. Respective flange supports 34a on each of the posts 34 provide a bearing surface for the lower end of the respective boss 52 to provide additional support, and assist with correct radial positioning of the filler insert 22.

Figure 5:
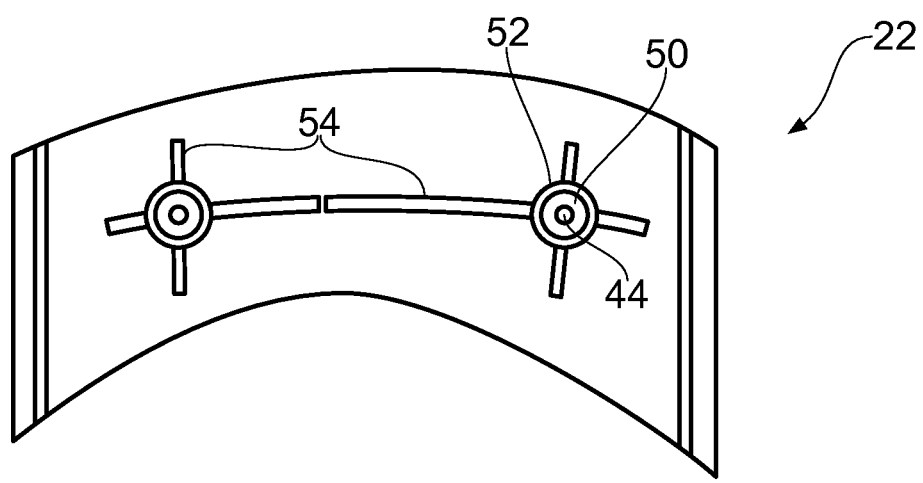
FIG. 5 is a simplified illustration of an annulus filler for use in the present invention, viewed from the underside.

Reinforcing ribs 54 are provided on the underside of the filler insert (best shown in FIG. 5).

The filler insert 22 may be formed from any suitable material and, in particular, aluminium or a fibre reinforced composite material such as Lytex®, which may conveniently be moulded to incorporate the reinforcing features such as the ribs 54. Additional features may also conveniently be moulded on the filler insert 22, for example to allow mechanical retention of respective sealing elements along the edges of the filler 22, for sealing engagement with adjacent blades 12. Use of relatively light, frangible materials is considered particularly advantageous for minimising impact damage in the unlikely event of detachment of the filler insert 22 during rotation of the fan 4. The annulus filler 22 may be made from transparent material to aid visibility of the pillars 34, thus further facilitating reliable assembly.

The pillars 34 are sufficiently stiff to provide axial retention of the annulus filler 22, so that no additional axial retention means is necessary. At the same time, the circumferential width of the pillars 34, relative to the annulus filler 22, allows for rolling movement of the annulus filler under a circumferential load, further reducing the possibility of filler detachment during a birdstrike of FBO event and limiting the effect of the annulus filler 22 on blade integrity.

Figure 6:
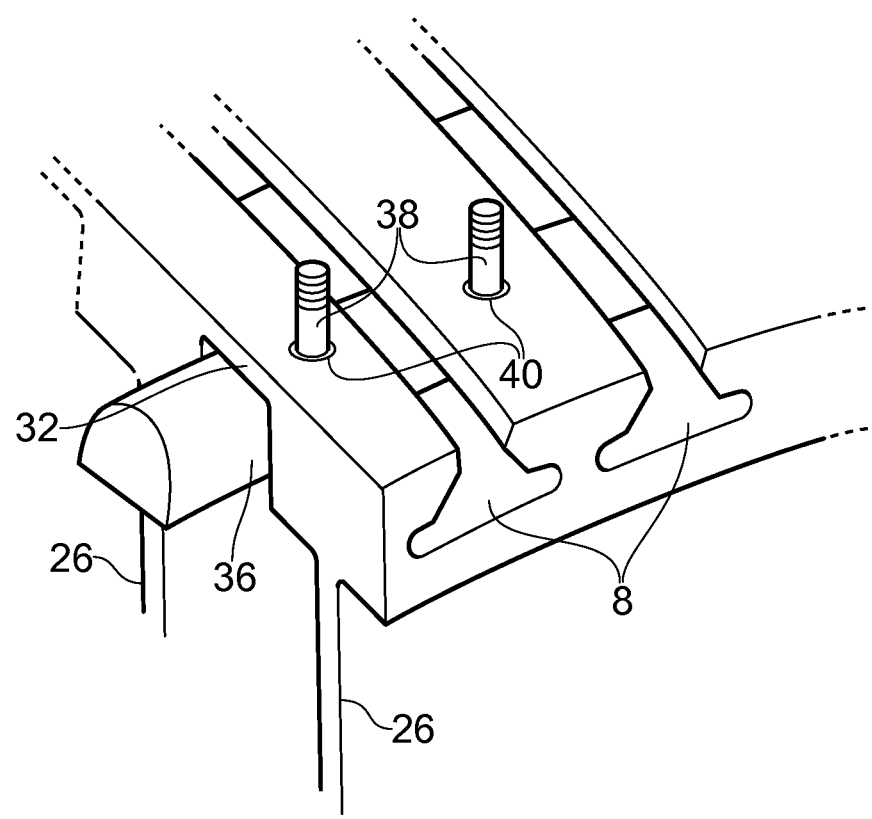
FIG. 6 is a perspective view of the fan rotor disc corresponding to FIG. 4, but provided with a chocking member in accordance with a further aspect of the present invention.

The anchor elements 36 may be ring segments which extend circumferentially along the channel 30 to provide a common anchor for more than one filler insert 22 on the fan rotor disc assembly 6, as illustrated in FIG. 6 (only the anchor element 36 and respective circumferentially spaced studs 38 are shown in FIG. 6, the remainder of the respective two filler insert assemblies having been omitted for clarity. It should be understood nevertheless that the studs 38 shown in FIG. 6 belong to separate filler insert assemblies, with each assembly in turn including a further stud spaced axially along the respective connecting portion 32. The blades 6 have also been omitted in FIG. 6 for clarity).

A plurality of such ring segments 36 may be provided to form a continuous ring along the channel 30 acting as a common anchor element for each of the plurality of filler inserts 22 supported around the fan rotor disc assembly 6.

Figure 7A:
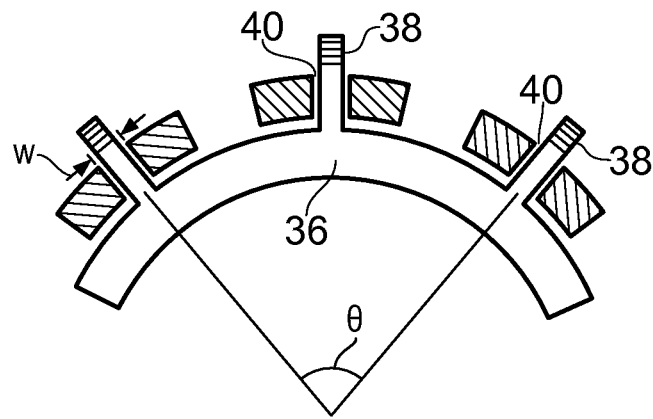
FIGS. 7a, 7b and 7c are schematic views illustrating various optional features of the chocking member in FIG. 6.

The studs 38 may be formed integrally with the respective ring segment 36, for example as shown in FIG. 7A. Alternatively, the studs 38 may be formed separately from the ring segment 36. For example, in FIG. 7B the studs 38 are in the form of bolts which extend through holes 37 in the ring segment 36. In this arrangement, the ring segment 36 is initially located in the channel 30 with the holes 37 aligned with the clearance holes 40, and the studs 38 are subsequently inserted through the aligned holes 37, 40.

It will be appreciated that in the case where the studs 38 are formed integrally with the ring segment 36, the circumferential length of the ring segment 36 will be limited in practical terms by the circumferential arc-width w of the holes 40 and the magnitude of the angle subtending the outer two studs 38. FIG. 7A shows three integral studs 38 subtended by a relatively large angle θ, which would require a correspondingly large arc-width for the holes 40; however, for a typical disc size it is envisaged that the ring segment 36 will span only two integral studs 38 in order practically to limit the arc-width w of the holes 40.

Figure 7B:
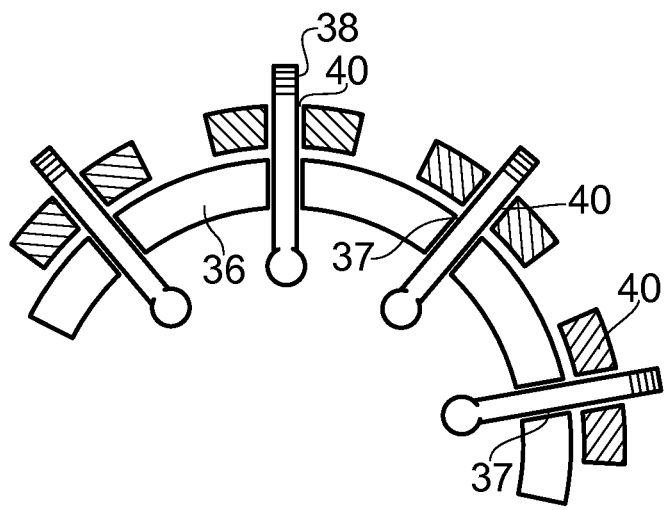

The arrangement in FIG. 7B removes the above-mentioned restriction on the circumferential length of the ring segment 36, because the holes 37, 40 are aligned prior to insertion of the studs 38. Nevertheless, in practical terms the circumferential length of the ring segment 36 will still be limited by access through the bore at the hub of the respective disc portion 26 which, for a typical disc size, may mean that the circumferential length of each individual ring segment 36 may be significantly less than that shown in FIG. 7B.

Figure 7C:
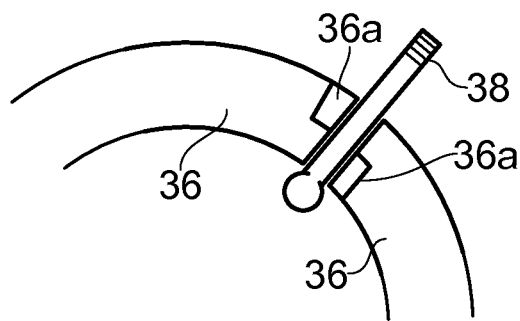

In the case where the studs 38 are formed separately, individual, adjacent ring segments 36 may be connected to one another by a stud 38 extending through aligned holes in interlocking flange portions 36A formed on the respective ring segments (see FIG. 7C).

Figure 8:
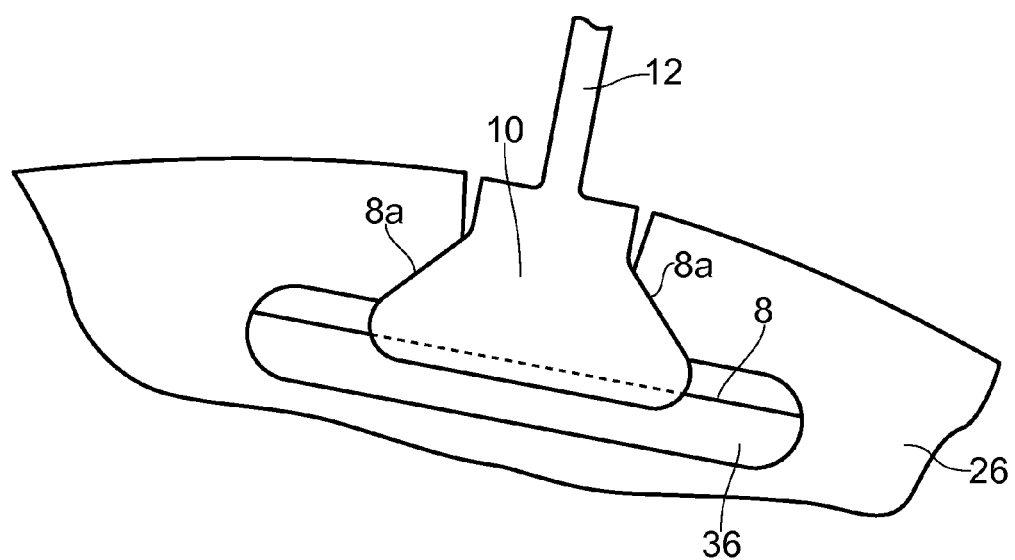
FIGS. 8 and 9 are orthogonal cross-sectional views illustrating the chocking action of the chocking member shown in FIG. 6.

According to another aspect of the present invention, the anchor element 36 forms part of a blade chocking assembly, with the anchor element 36 acting as a blade chocking member which engages the underside of one or more of the blades 12 (depending upon the circumferential length of the ring segment 36) thereby to chock the root of the blade 12 up against the flanks 8a of the respective dovetail slot 8 (see FIG. 8). The blade chocking member (anchor element 36) is effectively held in position by the pillars 34 on the outside of the rim 28, which therefore act as support elements for the blade chocking member (anchor element 36) as part of the blade chocking assembly.

Figure 9:
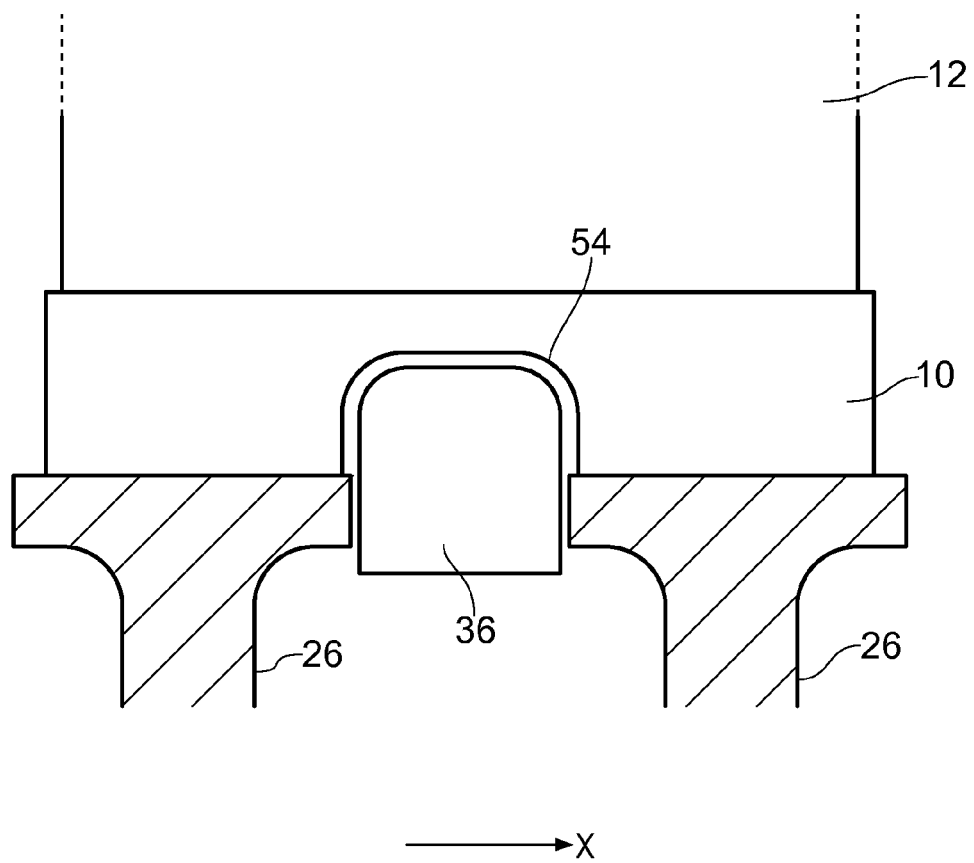

As best shown in FIG. 9, the blade chocking member (anchor element 36) engages with a circumferential groove 54 on the underside of each blade 12 thereby providing axial retention of the blade 12 (along the axis X in FIG. 9).

It will be appreciated, referring to FIG. 8 in particular (which shows the shape of the dovetail slot 8 only very schematically), that as the blade chocking member (anchor element 36) engages the groove 54 on the underside of the blade root 10, the blade root 10 thus presents substantially "clean" bearing surfaces to the flanks 8a, reducing the possibility of stress concentration across the bearing surfaces of the root 10 and flanks 8a.

The filler insert assembly 24 and blade chocking assembly advantageously cooperate through the clearance holes 40 to retain the filler insert 22 and blade chocking member (anchor element 36) in position on the outside and underside of the rim 28 respectively. In effect, a part of the annulus filler assembly 24 acts as the support element in the blade chocking assembly and a part of the blade chocking assembly acts as the anchor element in the annulus filler assembly, with the two assemblies co-operating through the clearance holes 40 in the connecting portions 32.

Retention of the blade chocking member (anchor element 36) by the pillars 34 may be particularly advantageous during assembly of the fan rotor disc assembly where the blade chocking member is not subject to any outwardly directed centrifugal force associated with rotation of the fan 4. Thus, during assembly of the fan rotor assembly, each of the ring segments 36 may conveniently be located in the channel 30 (each of the ring segments 36 must be sufficiently short to fit through an open hub section of the fan rotor disc assembly 6) and then secured to the pillars 34 on the outside of the rim 28 using studs 38. With each of the anchor elements 36 and pillars 34 conveniently secured in place, thus chocking the blades 12 in position, the respective filler inserts 22 can then each be attached to the pillars 34 from the outside of the insert 22, with alignment of the bore 44 and threaded hole 46 being sufficient for accurate fastening of the annulus filler 22 using the bolts 42. The bolts 42 are advantageously inserted from the outside of the annulus filler 22, so that there is no requirement to engage attachment features hidden beneath the annulus filler in order to secure the annulus filler 22 in position.

The spacer element may be formed integrally with the annulus filler, in which case a longer connecting stud may extend from the anchor element through both the spacer element and annulus filler for engagement with a corresponding threaded nut on the outside of the annulus filler. Prior to positioning the annulus filler on the connecting stud, a nut may be engaged with the connecting stud initially to secure the anchor element; this may be particularly desirable where the anchor element also acts as a blade chocking member, in which case the respective blade can conveniently be chocked prior to securing the annulus filler in position.

Although in the embodiment described the rotor assembly includes both an annulus filler assembly and a blade chocking assembly, it is envisaged that one or other of the annulus filler assembly and blade chocking assembly may be provided without the other. For example, a conventional threaded bolt may be used as the anchor element or support element, with the threaded bolt engaging respectively with part of the annulus filler assembly or blade chocking assembly through the clearance hole in the respective connecting portion, and the head of the bolt correspondingly bearing against the underside or outside of the rim to anchor the part or support the part as appropriate.

What is claimed is:

1. A rotor assembly comprising:
   i) a plurality of rotor discs interconnected by an axially extending rim, the outside of the rim having a circumferential array of dovetail slots and the underside of the rim having a circumferential channel which extends radially part way into the slots the respective discs thus being interconnected axially across the channel by an array of circumferentially spaced connecting portions;
   ii) an array of blades, each blade having a blade root secured in a respective one of the dovetail slots; and
   iii) an annulus filler assembly, having: an annulus filler supported on the outside of rim, between adjacent blades, so as to form part of the inner wall of a respective flow annulus, the annulus filler additionally being anchored on the underside of the rim by an anchor element which is connected to the annulus filler through a clearance hole in a respective one of the connecting portions, wherein the annulus filler is supported on the outside of the rim by a radially-extending spacer element forming part of the annulus filler assembly, the relative circumferential width of the spacer element and the annulus filler being such that the spacer element allows for rolling movement of the annulus filler under a circumferential load, wherein the spacer element is a separate component from the annulus filler, the spacer element being fixed to the anchor element through the clearance hole in the connecting portion, and the annulus filler being fastened to the spacer element through one or more bores in the annulus filler, wherein the spacer element is a pillar seated end-on over the clearance hole, the base of the pillar being screwed to the anchor element through the clearance hole thereby to clamp the pillar onto the outside of the connecting portion, and the opposite end of the pillar being provided with either a threaded hole or bolt which engages respectively with a corresponding bolt or nut through a bore in the annulus filler thereby to secure the annulus filler to the pillar.

2. A rotor assembly according to claim 1 additionally provided with a blade-chocking assembly, comprising:
   a blade chocking member extending circumferentially along the channel underneath at least one of the blade roots and engaging the underside of the blade root thereby to chock the blade radially outwardly against the flanks of the respective dovetail slot, the chocking member being held in said chocking engagement with the underside of the blade root by a support element seated on the outside of the rim and connected to the chocking member through a clearance hole in a respective one of the connecting portions of the rim; wherein a part of the annulus filler assembly on the outside of the rim acts as said support element in the blade-chocking assembly, and a part of the blade chocking assembly on the underside of the rim acts as said anchor element in the annulus filler assembly.

3. A rotor assembly according to claim 2, wherein the parts are clamped respectively against the outside and underside of the rim by a tension-bearing connector element secured between the parts through the clearance hole in the connecting portion.

4. A rotor assembly according to claim 2, wherein the annulus filler or spacer element acts as the support element in the blade-chocking assembly, and the chocking member acts as the anchor element in the annulus filler assembly.

5. A rotor assembly according to claim 4, wherein the chocking member is in the form of a segmented ring extending around the circumferential channel, the chocking member being connected to a respective annulus filler or spacer element in each of a plurality of said annulus filler assemblies through a corresponding plurality of said clearance holes.

6. A rotor assembly according to claim 5, wherein the chocking member is connected to each annulus filler or spacer element by tension-bearing connector elements in the form of studs.

7. A rotor assembly according to claim 6, wherein the chocking member comprises a plurality of holes for alignment with the clearance holes in the connecting portions, the studs being formed separately from the chocking member for insertion through the aligned holes.

8. A rotor assembly according to claim 1, wherein the annulus filler is fastened directly or indirectly to the anchor element through one or more bores in the annulus filler.

9. A rotor assembly according to claim 8, wherein the annulus filler is fastened by a threaded bolt which engages a corresponding nut through said bore(s) in the annulus filler.

10. A rotor assembly according to claim 1, wherein the annulus filler is formed from a frangible material.

11. A rotor assembly for a gas turbine, comprising:
i) a plurality of rotor discs interconnected by an axially extending rim, the outside of the rim having a circumferential array of dovetail slots and the underside of the rim having a circumferential channel which extends radially part way into the slots, the respective discs thus being interconnected axially across the channel by an array of circumferentially spaced connecting portions;
ii) an array of blades, each blade having a blade root secured in a respective one of the dovetail slots;
iii) an annulus filler assembly, having: an annulus filler supported on the outside of rim, between adjacent blades, so as to form part of the inner wall of a respective flow annulus, the annulus filler additionally being anchored on the underside of the rim by an anchor element which is connected to the annulus filler through a clearance hole in a respective one of the connecting portions; and
(iv) a blade-chocking assembly, having: a blade chocking member extending circumferentially along the channel underneath at least one of the blade roots and engaging the underside of the blade root thereby to chock the blade radially outwardly against the flanks of the respective dovetail slot, the chocking member being held in said chocking engagement with the underside of the blade root by a support element seated on the outside of the rim and connected to the chocking member through a clearance hole in a respective one of the connecting portions of the rim.

12. A rotor assembly according to claim 11, wherein the chocking member projects radially into a circumferentially-extending groove on the underside of the blade root thereby axially to retain the blade root in the slot.

\* \* \* \* \*